(12) United States Patent
Vinson et al.

(10) Patent No.: US 7,555,314 B2
(45) Date of Patent: Jun. 30, 2009

(54) DIGITAL MEDIA RECEIVER HAVING A READER

(75) Inventors: David Vinson, Cupertino, CA (US); Yancy Chen, Campbell, CA (US); Ameer Karim, San Jose, CA (US); Luca Lodolo, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 674 days.

(21) Appl. No.: 10/926,066

(22) Filed: Aug. 26, 2004

(65) Prior Publication Data

US 2006/0047817 A1    Mar. 2, 2006

(51) Int. Cl.
*H04M 1/00*    (2006.01)
(52) U.S. Cl. .............. 455/557; 455/556.1; 370/328
(58) Field of Classification Search ............ 725/80, 725/81, 109–112; 709/227, 250; 455/556.1, 455/556.2, 557, 575.1, 550.1; 370/328
See application file for complete search history.

(56) References Cited

U.S. PATENT DOCUMENTS

| | | | |
|---|---|---|---|
| 6,776,343 B1 * | 8/2004 | Gold et al. ............. 235/472.01 |
| 6,978,152 B1 * | 12/2005 | Yamaashi et al. ........... 455/526 |
| 7,146,629 B2 * | 12/2006 | Tsukada et al. ............. 725/106 |
| 2002/0071055 A1 | 6/2002 | Ooshima et al. |
| 2002/0101619 A1 * | 8/2002 | Tsubaki et al. .............. 358/302 |
| 2002/0199208 A1 | 12/2002 | Change et al. |
| 2003/0065823 A1 * | 4/2003 | Kim ........................... 709/250 |
| 2003/0112770 A1 * | 6/2003 | Sugiyama ................... 370/286 |
| 2003/0189546 A1 * | 10/2003 | Lamouline ................. 345/156 |
| 2003/0200403 A1 * | 10/2003 | Niwa et al. ................. 711/154 |
| 2004/0088440 A1 * | 5/2004 | Chen et al. ..................... 710/1 |
| 2004/0230489 A1 * | 11/2004 | Goldthwaite et al. .......... 705/26 |
| 2004/0244054 A1 | 12/2004 | Sheu et al. |
| 2004/0255326 A1 * | 12/2004 | Hicks et al. ................... 725/81 |
| 2005/0023339 A1 * | 2/2005 | Uno ........................... 235/375 |
| 2005/0052548 A1 * | 3/2005 | Delaney ................... 348/231.2 |
| 2005/0104976 A1 * | 5/2005 | Currans ................... 348/231.5 |
| 2005/0207848 A1 * | 9/2005 | Kunerth et al. ........... 405/129.1 |

FOREIGN PATENT DOCUMENTS

| EP | 1326173 | 7/2003 |
|---|---|---|
| EP | 1439666 | 7/2004 |

* cited by examiner

*Primary Examiner*—Nhan T Le

(57) ABSTRACT

A digital media receiver, method, and computer readable medium bearing instructions for transferring information from media to a connected computer system are described. The receiver includes a memory for storing instructions for execution, a first interface coupled with a processor for transmitting a signal representative of media information to a media presenting device, a reader coupled with the processor for transferring media information to the receiver, a second interface coupled with the processor and adapted to transfer information read by reader from media to a connected computer system, and the processor connected to the memory for executing the instructions enabling the processor to transfer information transferred by the reader to the connected computer system using the second interface. A method aspect includes responsive to input, reading information from media in a reader of a digital media receiver and transferring the read information from the media to a connection interface.

21 Claims, 3 Drawing Sheets

DIGITAL MEDIA RECEIVER HAVING A READER

FIELD OF THE INVENTION

The present invention relates to digital media receiver having a reader, a method for transferring information from a reader in a digital media receiver, and a computer-readable medium having instructions for transferring information from said reader.

BACKGROUND

It is known in the art to view pictures and movies and listen to music and other audio and video content on a television via a connected digital media receiver. The digital media receiver transmits the audio-visual content via audio and video interfaces to the television. The audio-visual content is often stored on a storage medium, memory, or a medium readable by the digital media receiver.

Disadvantageously, the A/V content must be loaded via a computer system to the digital media receiver or from the computer system to a medium which is physically transported to the digital media receiver and inserted into the digital media receiver via a connected reader.

Because most home computer systems are located in a den or home office, it is difficult to transfer A/V content from a television located in a living room to the den or home office. A person must download the desired A/V content at the computer system in the den or home office in addition to viewing/storing the A/V content at the digital media receiver. Further problematically, even if a person has stored the A/V content at one of the digital media receiver and the television, the content is transferable in only a single direction, namely from the computer system to the digital media receiver. A special trip must be made to the office or den in order to load A/V content from media, e.g., multi format memory cards.

SUMMARY

An embodiment according to the present invention provides a digital media receiver having a reader. The receiver is configured to read information from media inserted in the reader and transfer the information over a connection to a computer system.

An apparatus aspect includes a digital media receiver for transferring information from media to a connected computer system. The receiver includes a memory for storing a sequence of instructions for execution, a first interface coupled with the processor for transmitting a signal representative of a portion of information on the media to a media presenting device, a reader coupled with the processor for transferring information from the media to the receiver, a second interface coupled with the processor and adapted to transfer information read by reader from media to a connected computer system, and a processor connected to the memory for executing the sequence of instructions enabling the processor to transfer the information transferred by the reader to the connected computer system using the second interface.

A method aspect for transferring information from a reader in a digital media receiver includes, responsive to input, reading information from media in the reader and transferring the read information from the media to a connection interface.

A computer-readable medium aspect includes at least one sequence of machine executable instructions and the medium bearing the executable instructions. Execution of the instructions by a processor causes the processor to, responsive to input, read information from media in a reader of a digital media receiver and transfer the read information from the media to a connection interface.

Still other advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, a mechanism according to an embodiment of the present invention provides a digital media receiver having a reader and including store functionality.

Figure 1:
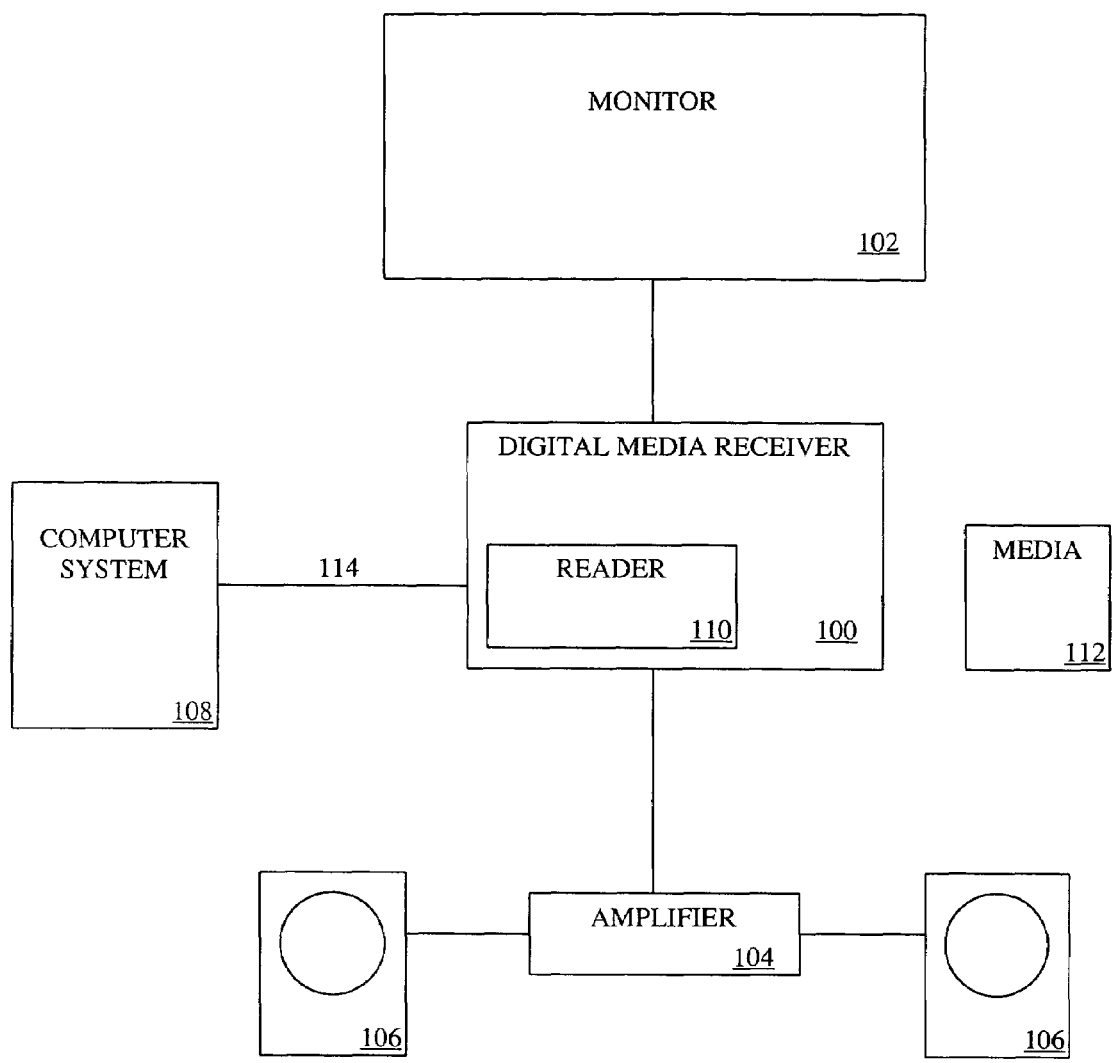
FIG. 1 is a high level block diagram of a device arrangement useable in conjunction with an embodiment according to the present invention.

FIG. 1 depicts a typical arrangement of a digital media receiver 100 connected to a monitor 102 to display video and an amplifier 104 to transmit audio via a pair of amplifier-connected speakers 106. In one embodiment, monitor 102 is a video monitor, e.g., a cathode ray tube, a liquid crystal display, digital light projector, or other type of video presentation device. Amplifier 104 is an audio amplifier, e.g., a stereo. In an alternate embodiment, monitor 102 and amplifier 104 are a single device, e.g., a television having a built-in amplifier 104 and speakers 106. In this embodiment, the digital media receiver 100 transmits an audio and/or video signal to the television for generation of audio sounds and/or video images.

Connections between digital media receiver 100, monitor 102, amplifier 104, and pair of speakers 106 are known to persons of skill in the relevant art and include wired and wireless connections for transmitting signals as described below.

Figure 2:
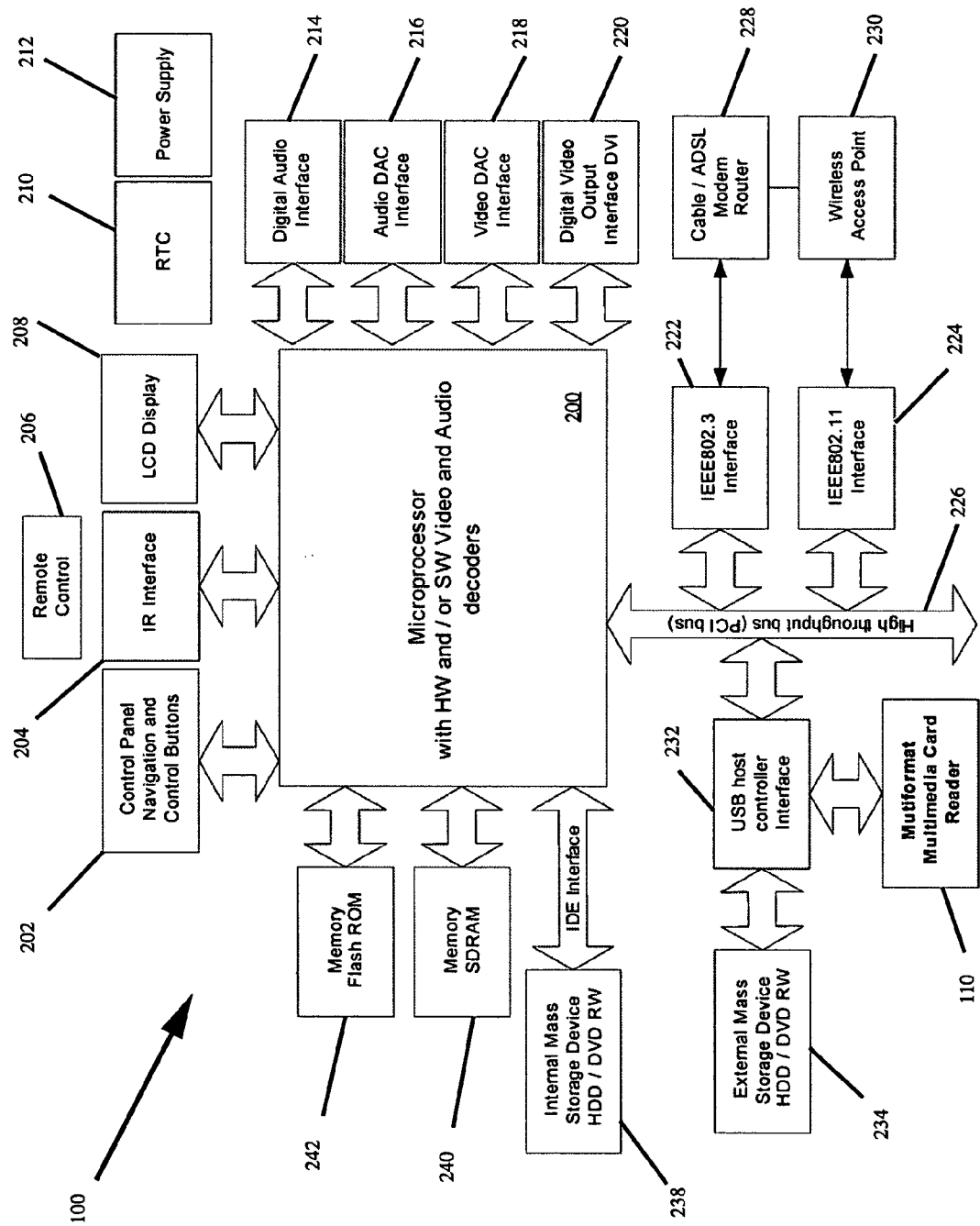
FIG. 2 is a high level block diagram of a digital media receiver depicted in FIG. 1.

As depicted in FIG. 1, receiver 100 includes a reader 110, e.g., a media reader, for connection with media 112, e.g., CompactFlash, SmartMedia, or other storage medium, and transferring information from the media to the receiver. Receiver 100 transfers the received media information to the connected computer system 108 for storage. In one embodiment, receiver 100 stores a local copy, i.e., a copy stored internal to the receiver, on an internal storage device, e.g., internal mass storage device 238 (FIG. 2). It is to be understood that receiver 100 can also transfer information to media 112 by way of reader 110. That is, reader 110 may also write information to media 112. Further, it is to be understood that receiver 100 can transfer information from connected computer system 108 to reader 110 and thereon to media 112.

A connection 114 connects computer system 108 and digital media receiver 100 enabling information transfer between the computer system and the digital media receiver. Connection 114 may be a network connection, e.g., a wired or wireless connection such as according to the IEEE 802.3 or 802.11 standards, or a local connection, e.g., a USB, Firewire, serial, or parallel connection.

Computer system 108, described in detail below in conjunction with FIG. 3, includes an operating system comprising instructions executed by processor 304 (FIG. 3) to cause the computer system to operate in a programmed manner according to the instructions. One functionality provided by operation of computer system 108 is a file sharing service enabling the transfer of files to/from the computer system, e.g., a file transfer protocol such as server message block (SMB), common internet file system (CIFS), NetWare core protocol (NCP), AppleTalk filing protocol (AFP), network file system (NFS), and others. In one embodiment, a portion of storage space on a storage device 310 (FIG. 3) of computer system 108 is shared via the file sharing service and made available via connection 114 to other devices, e.g., digital media receiver 100.

Digital media receiver 100 includes a file sharing service similar to the above-described service of computer system 108. In one embodiment, a portion of storage space on internal mass storage device 238 or external mass storage device 234 of receiver 100 is shared via the file sharing service and made available via connection 114 to other devices, e.g., computer system 108.

In operation according to an embodiment of the present invention, a user inserts media 112 having stored thereon images, sounds, video, etc. which the user desires 1) to display on monitor 102 and/or play using amplifier 104 and/or 2) to store a copy on computer system 108 into reader 110 of digital media receiver 100. In response to user-input commands entered using control 202 in conjunction with display 208, digital media receiver 100 causes reader 110 to read the information stored on media 112 and display a representation of the information on monitor 102. In one embodiment, an audio representation of the information may be audibly transmitted using amplifier 104 in conjunction with speaker pair 106. In another embodiment, the user enters commands as input to digital media receiver 100 using remote control 206.

Next, user-input commands using control 202 received by digital media receiver 100 cause the receiver to select one or more items of the information stored on media 112 in order to specify the information to be transferred to computer system 108. The user then manipulates control 202 causing the input of a command causing the digital media receiver 100 to establish a file sharing protocol connection to computer system 108.

Next, user-input commands received by digital media receiver 100 cause the receiver to transfer selected information over connection 114 to computer system 108 for storage. In this manner, the user need only insert media 112 at digital media receiver 100 in order to store information at computer system 108. In one embodiment, images stored on media 112 are transferred to digital media receiver 100 by reader 110 and then transferred to computer system 108 via connection 114 and stored on storage device 310 (FIG. 3). Transferred images are stored in a designated directory on storage device 310.

For example, images stored on a compact flash card are read by a multiformat multimedia card reader in the digital media receiver 100 and then transferred by receiver 100 to a "My Documents" folder on computer system 108. In a further embodiment, receiver 100 creates a directory within the designated directory on storage device 310 for storage of the transferred information, e.g., images, sounds, etc., and names the directory based on the current date and time. Alternatively, the directory may be named based on information related to the information being stored therein, e.g., based on image creation date information stored with image files.

In an alternate embodiment, a display on digital media receiver 100 (LCD Display 208 of FIG. 2) displays an indicator representative of information on media 112 and the user enters commands causing the digital media receiver to transfer selected information, selected based on the display at receiver 100, from receiver 100 to computer system 108. In one embodiment, digital media receiver 100 initially selects all information for transfer and storage to computer system 108 and the user input deselects information not to be transferred. In another embodiment, initially no information is selected for transfer and storage and the user input selects the information to be transferred.

In still another embodiment, upon insertion of media 112 into reader 110, digital media receiver 100 automatically transfers the information from media 112 to computer system 108 and/or internal storage, e.g., internal mass storage device 238 (FIG. 2) based on a predetermined setting. That is, user input is not required by digital media receiver 100 in order to transfer and store information from media 112.

In another embodiment, with media 112 inserted into reader 110, a user manipulates input device 314 and/or cursor control 316 of computer system 108 to cause the computer system to establish a file sharing protocol connection with digital media receiver 100. Next, user-input commands cause the computer system 108 to read the information stored on media 112 and display a representation of the information on display 312. Next, user-input commands received by computer system 108 cause the computer system to select one or more items of the information stored on media 112 in order to specify the information to be transferred to computer system 108. Next, user-input commands received by computer system 108 cause the computer system to transfer selected information over connection 114 from digital media receiver 100 to computer system 108 for storage. Transferred images are stored in a designated directory on storage device 310.

FIG. 2 depicts a high level block diagram of digital media receiver 100 in FIG. 1. The receiver 100 includes a microprocessor 200 for execution of sequences of instructions causing the microprocessor to enable the storage functionality according to an embodiment of the present invention. The receiver includes additional components connected to microprocessor 200 enabling input/output of data and instructions to/from microprocessor 200. Addressing the components schematically aligned along the top edge surrounding microprocessor 200 depicted in FIG. 2, the components include a control panel navigation and control buttons module 202 for receiving user command input to digital media receiver 100, an infrared interface module 204 for receiving user command input transmitted by a remote control unit 206 via infrared signals, a liquid crystal display 208 for displaying information to a user directly from receiver 100, a real time clock (RTC) component 210 for providing a clock signal to receiver 100, and a power supply component 212 for providing power to receiver 100.

Addressing the components schematically aligned along the right edge surrounding microprocessor 200 depicted in FIG. 2, the components include a digital audio interface component 214 for transferring digital audio signals to/from receiver 100, an audio digital analog conversion (DAC) interface component 216 for transferring analog audio signals to/from receiver 100 and performing a digital-analog conversion of the signal as appropriate for the direction of the signal transfer, a video DAC interface component 218 for transferring analog video signals to/from receiver 100 and performing a digital-analog conversion of the signal as appropriate for the direction of the signal transfer, a digital video output interface digital video interconnect (DVI) component 220 for transferring digital video signals to/from receiver 100.

Addressing the components schematically aligned along the bottom edge surrounding microprocessor 200 depicted in FIG. 2, the components include a pair of network interfaces 222, 224 connected to a high throughput bus, e.g., a peripheral component interconnect (PCI) bus, in turn connected to microprocessor 200. Network interface 222 is a wireline-based interface, e.g., an interface meeting the Institute for Electrical, Electronics Engineers (IEEE) 802.3 interface standard, and network interface 224 is a wireless-based interface, e.g., an interface meeting the IEEE 802.11 interface standard. Wireline network interface 222 is connectable to a wireline network connection 228, e.g., a cable or digital subscriber line (DSL) modem or router, and wireless network interface 224 is connectable to a wireless network connection 230, e.g., a wireless access point. Continuing along the bottom edge surrounding microprocessor 200, the components further include a universal serial bus (USB) host controller interface 232 for transferring USB protocol signals to/from receiver 100, an external mass storage device 234, e.g., an external hard disk drive, a compact disc (CD) reader and/or writer, a digital versatile disc (DVD) reader and/or writer, etc., connected to USB host controller interface 232, and a reader 110, e.g., a multiformat multimedia card reader, for transferring data between multimedia cards, e.g., compact flash, smart disk, memory stick, etc., and receiver 100 connected to USB host controller interface 232. In another embodiment, reader 110 is also a writer able to store data on multimedia cards.

Addressing the components schematically aligned along the left edge surrounding microprocessor 200 depicted in FIG. 2, the components include an internal mass storage device 238, e.g., a hard disk drive, a CD reader and/or writer, a DVD reader and/or writer, etc., connected to an interface, e.g., an IDE interface, for storing sequences of instructions for execution by processor 100 and data, a volatile memory component 240, e.g., an SDRAM, for storing instructions and data for use by microprocessor 100, and a non-volatile memory component 242 for storing non-volatile instructions and data for use by microprocessor 100.

Digital media receiver 100 connects to a computer system 108 via a wired or wireless connection, i.e., wireline interface 222 or wireless interface 224, to transmit and receive signals, e.g., audio, video, and other data signals. In an alternate embodiment, digital media receiver 100 includes additional components connected via high throughput bus 226 in order to transmit and receive signals to/from computer system 108 or other networked devices. Computer system 108 includes numerous types of microprocessor-based computing platforms, e.g., portable and non-portable computer systems, and is described in detail with respect to FIG. 3 below.

Figure 3:
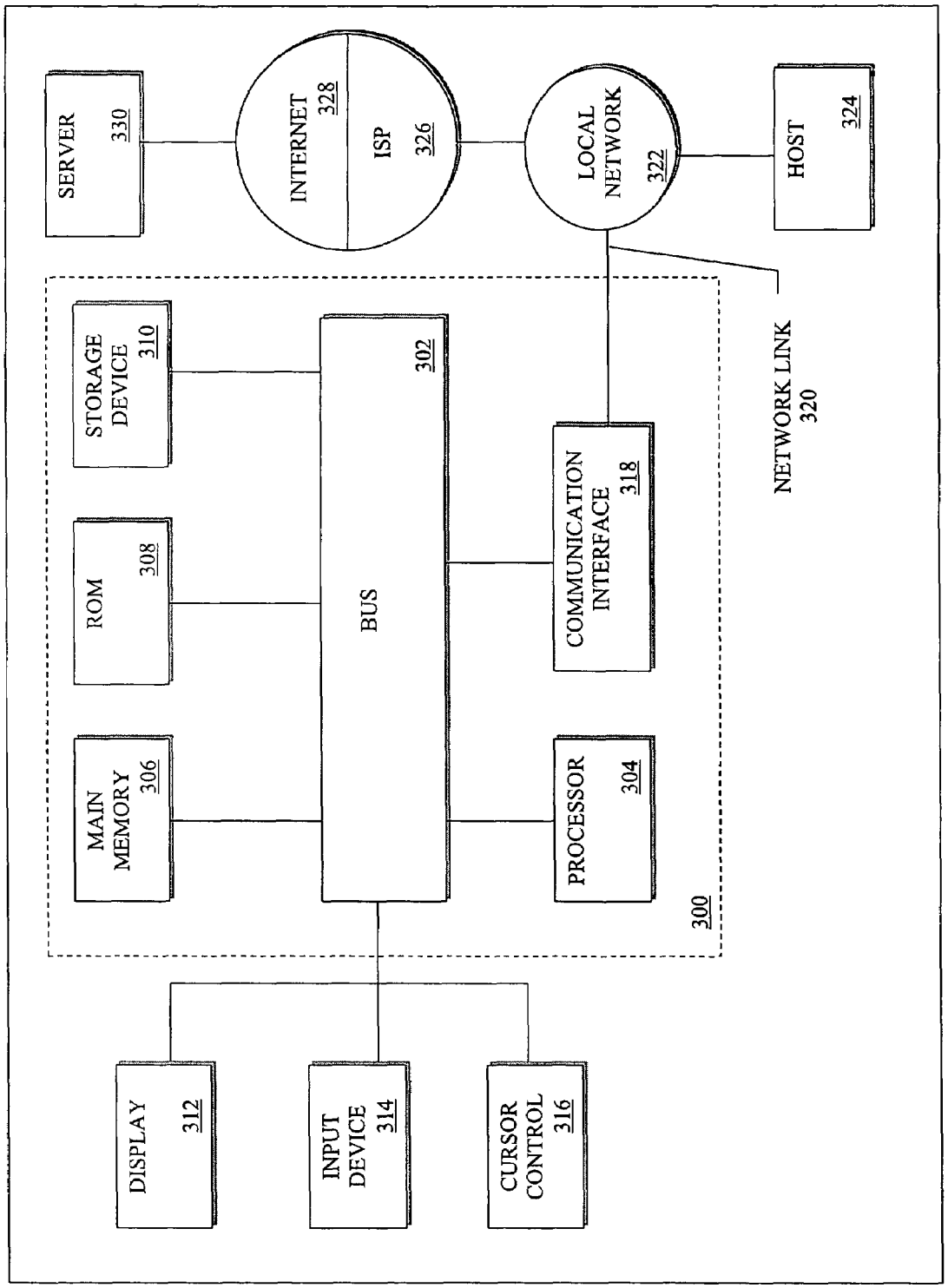
FIG. 3 is a high level block diagram of a computer system depicted in FIG. 1.

FIG. 3 is a block diagram illustrating an exemplary computer system 108 upon which an embodiment of the invention may be implemented. Embodiments according to the present invention is usable with currently available personal computers, mini-mainframes, workstations, and the like.

Computer system 108 includes a bus 302 or other communication mechanism for communicating information, and a processor 304 coupled with the bus 302 for processing information. Computer system 108 also includes a main memory 306, such as a random access memory (RAM) or other dynamic storage device, coupled to the bus 302 for storing data, information, and instructions to be executed by processor 304. Main memory 306 also may be used for storing temporary variables or other intermediate information during execution of instructions to be executed by processor 304. Computer system 108 further includes a read only memory (ROM) 308 or other static storage device coupled to the bus 302 for storing static information and instructions for the processor 304. A storage device 310, such as a magnetic disk or optical disk, is provided and coupled to the bus 302 for storing data, information, and instructions.

Computer system 108 may be coupled via the bus 302 to a display 312, such as a cathode ray tube (CRT) or a flat panel display, for displaying information to the user. An input device 314, including alphanumeric and function keys, is coupled to the bus 302 for communicating information and command selections to the processor 304. Another type of user input device is cursor control 316, such as a mouse, a trackball, or cursor direction keys for communicating direction information and command selections to processor 304 and for controlling cursor movement on the display 312. This input device typically has two degrees of freedom in two axes, a first axis (e.g., x) and a second axis (e.g., y) allowing the device to specify positions in a plane.

The invention is related to the use of computer system 108, such as the illustrated system of FIG. 3, to store information received and/or obtained by digital media receiver 100. According to one embodiment of the invention, the information on media 112 is obtained by computer system 108 in response to processor 304 executing sequences of instructions contained in main memory 306 in response to input received via input device 314, cursor control 316, or communication interface 318. Such instructions may be read into main memory 306 from another computer-readable medium, such as storage device 310.

However, the computer-readable medium is not limited to devices such as storage device 310. For example, the computer-readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a random access memory (RAM), a programmable read only memory (PROM), an electrically programmable read only memory (EPROM), a FLASH-EPROM, any other memory chip or cartridge. Execution of the sequences of instructions contained in the main memory 306 causes the processor 304 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 108 also includes a communication interface 318 coupled to the bus 302. Communication interface 308 provides two-way data communication as is known. For example, communication interface 318 may be an integrated services digital network (ISDN) card, a digital subscriber line (DSL) card, or a modem to provide a data communication connection to a corresponding type of telephone line. As another example, communication interface 318 may be a local area network (LAN) card to provide a data communication connection to a compatible LAN. In another example, communication interface may be a serial interface, such as a USB-type interface. Wireless links may also be implemented. In any such implementation, communication interface 318 sends and receives electrical, electromagnetic or optical signals which carry digital data streams representing various types of information. Of particular note, the communications through interface 318 may permit transmission or receipt of information from media 112 via digital media receiver 100. For example, two or more computer systems 108 may be networked together in a conventional manner with each using the communication interface 318. As depicted in FIG. 1, communication interface may be connected to connection 114 described above.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals which carry digital data streams.

Computer system 108 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for obtaining and/or receiving information from media 112 inserted into digital media receiver 100.

The received code may be executed by processor 304 as it is received, and/or stored in storage device 310, or other non-volatile storage for later execution.

There are numerous advantages to the above-described digital media receiver having a reader and including store functionality. The digital media receiver according to an embodiment of the present invention provides a remote card reader for the computer system via a home network, e.g., a wired or wireless network. Users no longer need to make a special trip to the den or home office away from the living room in order to load content from media to the computer system. Users are able to load content from memory cards in the living room where the user is most likely to view the content and where the user is most comfortable.

Users are able to download content from media into a local mass storage device, e.g., internal or external hard drive, or transfer the content into other mass storage devices, e.g., internal or external compact disc (CD), digital versatile disc (DVD) or other readable and writable medium.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A digital media receiver for transferring information from insertable media to an external connected computer system, the receiver comprising:
   a memory for storing a sequence of instructions for execution;
   a first interface coupled with a processor arranged to transmit a signal representative of a portion of information on the insertable media to a media presenting device;
   a media reader coupled with the processor arranged to transfer information from the insertable media to the receiver, wherein the media reader is arranged to read the insertable media;
   a second interface coupled with the processor and adapted to transfer information read by the media reader from the insertable media to the external connected computer system; and
   the processor connected to the memory for executing the sequence of instructions enabling the processor to transfer the information transferred by the media reader to the external connected computer system using the second interface, wherein the processor is adapted to automatically transfer at least a portion of the information on the insertable media to the external connected computer system using the second interface upon insertion of the insertable media in the media reader.

2. The receiver of claim 1, wherein the first interface is at least one of a video interface and an audio interface.

3. The receiver of claim 1, further comprising:
   a third interface coupled with the processor for transmitting a signal representative of another portion of information on the insertable media to a media presenting device.

4. The receiver of claim 1, wherein the second interface is at least one of wireline connection or a wireless connection.

5. The receiver of claim 1, further comprising:
   an input control coupled with the processor and adapted to receive user-supplied commands.

6. The receiver of claim 5, wherein the digital media receiver is arranged to transfer a portion of the information on the insertable media to the external connected computer system responsive to manipulation of the input control by the user.

7. The receiver of claim 6, further comprising:
   a display coupled with the processor and adapted to display a representation of the information on the insertable media to a user.

8. The receiver of claim 1, wherein in response to receipt of user-supplied commands received from the connected computer system using the second interface, the digital media receiver transfers at least a portion of the information on the insertable media to the external connected computer system.

9. The receiver of claim 1, wherein in response to receipt of user-supplied commands received from the connected computer system using the second interface, the digital media receiver transfers a signal representative of at least a portion of information on the insertable media to the external connected computer system.

10. The receiver of claim 1, wherein the processor is further arranged to automatically transfer the information transferred by the media reader to the external connected computer system using the second interface responsive to insertion of the insertable media into the media reader.

11. The receiver of claim 1, wherein the media reader is further arranged to transfer information from the receiver to the insertable media.

12. A method of transferring information from a media reader in a digital media receiver, comprising:
   transmitting, using a first interface coupled with a processor, a signal representative of a portion of information on insertable media to a media presenting device;
   reading information from the insertable media in a media reader of the digital media receiver; and
   transferring, using a second interface coupled with the processor, the information read by the media reader from the insertable media to an external connected computer system, wherein the processor executes a sequence of instructions stored in a memory to transfer the information transferred by the media reader to the external connected computer system using the second interface, wherein the processor is adapted to automatically transfer at least a portion of the information on the insertable media to the external connected computer system using the second interface upon insertion of the insertable media in the media reader.

13. The method of claim 12, wherein the input is a media insert signal.

14. The method of claim 12, wherein the input is user input received via at least one of the connection interface or a control at the digital media receiver.

15. The method of claim 12, wherein the reading step further comprises:

displaying a representation of at least a portion of the information to the user.

16. The method of claim 15, wherein the transferring step further comprises:

responsive to user input selecting at least one of the displayed representation, the transferring comprises transferring read information corresponding to the selected representation from the media to the external connected computer system using the connection interface.

17. The method of claim 12, wherein the reading information from insertable media occurs automatically in response to receipt of a media insert signal.

18. The method of claim 12, further comprising:

writing information, received by the digital media receiver from the external connected computer system, to the insertable media.

19. A computer-readable medium comprising:

at least one sequence of machine executable instructions stored in a memory; and the medium storing the executable instructions, wherein execution of the instructions by a processor causes the processor to:

transmit, using a first interface coupled with the processor, a signal representative of a portion of information on insertable media to a media presenting device; read information from the insertable media in a media reader of a digital media receiver; and transfer, using a second interface coupled with the processor, the information read by the media reader from the insertable media to an external connected computer system, wherein the processor is adapted to automatically transfer at least a portion of the information on the insertable media to the external connected computer system using the second interface upon insertion of the insertable media in the media reader.

20. The medium of claim 19, wherein the input is at least one of user input or a media insert signal.

21. The medium of claim 19, wherein the input is user input received via at least one of the connection interface or a control at the digital media receiver.

\* \* \* \* \*